Patented May 18, 1943

2,319,669

UNITED STATES PATENT OFFICE 2,319,669

PROCESS FOR PREPARING HYDROXYL-AMINE HYDROCHLORIDE

Philip J. Ehman and Walter O. Walker, Marinette, Wis., assignors to Ansul Chemical Company, Marinette, Wis., a corporation of Wisconsin No Drawing. Application November 24, 1941, Serial No. 420,308

19 Claims. (Cl. 23—87)

This invention relates to a process for preparing hydroxylamine hydrochloride. More specifically the invention relates to a process for the preparation of a pure grade of hydroxylamine hydrochloride from nitric acid, hydrochloric acid, acetone and chlorine.

The invention is based upon the discovery that under proper controlled conditions acetone can be reacted with a mixture of nitric acid and hydrochloric acid to produce chloroisonitrosoacetone, $CH_3COCl:NOH$ (in 60 to 70% yield based on the nitric acid used), which when dissolved in water and reacted with chlorine gas produces phosgene oxime, $CCl_2:NOH$ (in 55 to 65% yield based on the chloroisonitrosoacetone used), and which when hydrolyzed in dilute hydrochloric acid, yields hydroxylamine hydrochloride, almost quantitatively (based on phosgene oxime). The successful operation of this invention lies in the discovery of a method for making chloroisonitrosoacetone in good yield, from acetone, nitric acid and hydrochloric acid, and in producing a reaction liquor in which the chloroisonitrosoacetone can be chlorinated directly, and in the discovery of a method of separating unreacted chloroisonitrosoacetone from the products of chlorination, which makes possible the direct production of a pure hydroxylamine hydrochloride.

The following procedure is an illustrative embodiment of the invention: When 50 pounds of acetone is added slowly, with stirring, to a mixture of 100 pounds of concentrated (sp. gr. about 1.40) nitric acid and 75 pounds of concentrated (sp. gr. about 1.18) hydrochloric acid, during about one hour over a reaction-temperature range of 30° C. to 70° C. in a suitable reaction vessel, (for example, a glass-lined vessel equipped with a tantalum cooling coil) there will be produced a solution containing about 70 pounds of chloroisonitrosoacetone. When this solution is diluted with about an equal volume of water, cooled to between 20° C. and 10° C. and treated with chlorine gas (a maximum of about 80 pounds required) for about six hours in a suitable gas dispersion unit (such as a ceramic packed tower or an agitated vessel constructed from Hastelloy C composed of iron 6%, chromium 5%, molybdenum 17% and nickel 58%) there will be produced a solution of about 33 pounds of phosgene oxime. By subjecting this solution to an almost complete distillation at reduced pressure (20 to 50 mm. of Hg) in any suitable distillation unit (such as one made from Durichlor composed of iron 80%, silicon 14.5%, molybdenum 3.5% and nickel 1.0% or from glass-lined equipment with a tantalum heater) there will be produced a residue of about 20 to 25 pounds of unreacted chloroisonitrosoacetone, which can be added to the next reaction liquor to be chlorinated, and an aqueous distillate which will contain all the phosgene oxime as described in copending application Serial No. 420,309, filed November 24, 1941, Patent 2,299,742. When this distillate is heated to boiling, in a glass-lined digester equipped with a tantalum heater, the hydrolysis of the phosgene oxime will be complete in two to three hours, producing a solution containing about 20 pounds of hydroxylamine hydrochloride. When this solution is evaporated, preferably at reduced pressure in a glass-lined evaporator equipped with a tantalum heater, crystals of pure (over 99%) hydroxylamine hydrochloride will precipitate from the concentrated solution. If the solution is evaporated to dryness about 20 pounds of about 99% pure hydroxylamine hydrochloride will be obtained. When the yield from the 20 to 25 pounds of unreacted chloroisonitrosoacetone is included the amount will be increased to 25 to 28 pounds. This is 36 to 40% of the theoretical yield on the basis of nitric acid. The materials of construction given are those preferred, but the practice of our invention is not necessarily limited to those given.

In the foregoing example the quantities, concentrations and other conditions which are specified are those which have given a good yield of hydroxylamine hydrochloride in a satisfactory period of time. We have found that a number of these factors can be varied and we can still obtain a good yield in a satisfactory period of time, and that other factors can be varied to obtain as good or better yield in a longer time and still others can be varied to obtain a slightly decreased yield in a shorter period of time. For example, the quantity of concentrated hydrochloric acid can be varied from about 65 pounds to 90 pounds (containing 24 to 33 parts by weight of 100% HCl), the acetone from about 45 pounds to 60 pounds for each 100 pounds of concentrated nitric acid (containing 70 parts of 100% nitric acid), water from 60 to 100 parts by weight, and the time of reaction of the acetone with the acid mixture from one-half hour to two hours and we still obtain a good yield of hydroxylamine hydrochloride in a satisfactory period of time. When the dilution with water of the reaction mixture containing chloroisonitrosoacetone is varied from 0 to 2-fold, when the chlorination temperature is kept between 0° C. and 10° C. during a longer time of chlorination, the yield of hydroxylamine hydrochloride will be as good or even better than in the example, but the production time will be prolonged. When hydrochloric acid of specific gravity from 1.10 to 1.18 is used, when nitric acid of specific gravity from 1.20 to 1.40 is used, and when temperature of chlorination is varied from 20° C. to 50° C. the production time will be the same or less but the yield will suffer. Besides these variations the chloroisonitrosoacetone can be separated from the reaction mixture and dissolved in water for chlorination. The chloroisonitrosoacetone may be separated from the reaction mixture by cooling and filtering, or by evaporating, cooling and filtering, and dissolving 70 parts by weight in from 100 to 1000 parts by weight of water. We find it advantageous to use, for example, 70 parts by weight of chloroisonitrosacetone in about 500 parts by weight of water. The resulting solution may be treated with chlorine gas for from one to twelve hours at a temperature of 0° C. to 50° C. The resulting chlorinated solution containing phosgene oxime is distilled at reduced pressure almost to dryness to yield an aqueous distillate containing the phosgene oxime and a residue of unreacted chloroisonitrosoacetone which can be added to the next solution to be chlorinated. The distillate containing phosgene oxime is boiled for about two hours and then evaporated at reduced pressure to dryness or until hydroxylamine hydrochloride begins to separate out. The percentage of chlorination of the chloroisonitrosoacetone per run may also be lowered.

The quantities of concentrated hydrochloric acid and acetone for each 100 pounds of concentrated nitric acid can be varied outside the limits already specified but the yield of hydroxylamine hydrochloride in all cases will be less. For example, the concentrated hydrochloric acid may be varied from 10 to 150 pounds (containing 4 to 55 pounds of 100% HCl) and the acetone may be varied from 5 to 100 pounds, for each 100 pounds of concentrated nitric acid (containing 70 pounds of 100% HNO₃). Furthermore, the operation of this invention is not limited to the use of concentrated acids. For example, 5 to 100 pounds of acetone may be added to a mixture containing 4 to 55 pounds of 100% HCl, 70 pounds of 100% HNO₃ and 5 to 200 parts of water, regardless of the strength of acids used to make up the mixture, and the time of reaction of the acetone with the acid mixture may be from one-half to five hours at a reaction temperature of 30° C. to 70° C. The resulting reaction mixture may be diluted with water up to five-fold in volume and then treated with chlorine gas for from one to twelve hours at a temperature of 0° C. to 50° C. The resulting chlorinated solution is boiled from about two to five hours and the resulting solution is evaporated at reduced pressure to obtain the hydroxylamine hydrochloride. As an alternative procedure, chloroisonitrosoacetone may be separated from the reaction mixture produced by reacting acetone with the acid mixture by cooling the reaction mixture and filtering, or by evaporating, cooling and filtering. The chloroisonitrosoacetone is then dissolved in from 100 to 1000 parts by weight of water and the resulting solution treated with chlorine gas for from one to about twelve hours at a temperature of 9° C. to 50° C. The resulting chlorinated solution is then boiled for from about two to five hours and the solution so obtained is evaporated at reduced pressure to yield hydroxylamine hydrochloride.

An important feature of this invention economically, is the recovery of by-products. The distillate obtained from the reduced pressure evaporation of the hydroxylamine hydrochloride solutions will contain chloropicrin as an insoluble oil and acetic acid and hydrochloric acid in solution. The chloropicrin can be separated mechanically, washed with lime water and steam distilled. The yield is about 10 pounds per 100 pounds of nitric acid. The acetic acid can be separated by extraction with a suitable solvent such as isopropyl ether according to recognized industrial methods. The yield is about 35 pounds per 100 pounds of nitric acid. The hydrochloric acid can be recovered as 20% acid by distillation and can be converted to concentrated (sp. gr. 1.18) acid by any known method. The yield is about 60 pounds of 100% HCl per 100 pounds of nitric acid.

The hydroxylamine hydrochloride obtained by complete evaporation of the solution prepared as described in the example has been found by analysis to contain at least 99% hydroxylamine hydrochloride. It can be further purified by recrystallization from water or other solvents if desired. A pure product can also be obtained by fractional crystallization of the original hydroxylamine hydrochloride solution. To remove the last traces of water and HCl from any of these preparations it is necessary to dry them thoroughly, preferably at a low temperature in an evacuated vessel.

It is understood that the examples given are illustrative embodiments of our invention and that the procedure for carrying out the invention may be considerably modified within the controlled conditions disclosed which are intended to be included in the appended claims.

We claim:

1. A process for preparing hydroxylamine hydrochloride which comprises reacting acetone with a mixture of nitric acid and hydrochloric acid, chlorinating the resulting reaction mixture to produce a solution containing phosgene oxime, heating said solution to boiling until the hydrolysis of phosgene oxime is complete and evaporating the resulting solution at reduced pressure until hydroxylamine hydrochloride crystallizes from the concentrated solution.

2. A process for preparing hydroxylamine hydrochloride which comprises slowly adding acetone to a mixture of nitric acid and hydrochloric acid while stirring, chlorinating the resulting reaction mixture with chlorine gas to produce a solution containing phosgene oxime, heating said solution to boiling until the hydrolysis of phosgene oxime is complete and evaporating the resulting solution at reduced pressure until hydroxylamine hydrochloride crystallizes from the concentrated solution.

3. A process for preparing hydroxylamine hydrochloride which comprises reacting acetone with a mixture of concentrated nitric acid and concentrated hydrochloric acid, chlorinating the resulting reaction mixture with chlorine gas to produce a solution containing phosgene oxime, heating said solution to hydrolyze the phosgene oxime and evaporating the resulting solution to recover hydroxylamine hydrochloride.

4. A process for preparing hydroxylamine hydrochloride which comprises reacting 45 to 60 parts by weight of acetone with an acid mixture containing 24 to 33 parts by weight of 100% HCl, 70 parts by weight of 100% HNO₃ and 60 to 100 parts by weight of water during one-half to two hours at a reaction temperature of 30° C. to 70° C., treating the resulting reaction mixture with chlorine gas, boiling the resulting chlorinated solution and then evaporating the resulting solution to separate hydroxylamine hydrochloride.

5. A process for preparing hydroxylamine hydrochloride which comprises reacting 45 to 60 parts by weight of acetone with an acid mixture containing 24 to 33 parts by weight of 100% HCl, 70 parts by weight of 100% HNO₃ and 60 to 100 parts by weight of water during one-half to two hours at a reaction temperature of 30° C. to 70° C., diluting the resulting reaction mixture with water up to two-fold in volume, treating the resultant solution with chlorine gas, for from one to twelve hours at a temperature of 0° C. to 50° C., boiling the resulting chlorinated solution from about two to five hours and then evaporating the resulting solution at reduced pressure to obtain hydroxylamine hydrochloride.

6. A process for preparing hydroxylamine hydrochloride which comprises reacting 45 to 60 parts by weight of acetone with an acid mixture containing 24 to 33 parts by weight of 100% HCl, 70 parts by weight of 100% HNO₃ and 60 to 100 parts by weight of water during one-half to two hours at a reaction temperature of 30° C. to 70° C., separating the chloroisonitrosoacetone from the resulting mixture by cooling and filtering, or by evaporating, cooling and filtering, dissolving the chloroisonitrosoacetone in from 100 to 1000 parts by weight of water, treating said solution with chlorine gas for from one to twelve hours at a temperature of 0° C. to 50° C., boiling the resulting chlorinated solution from about two to five hours and then evaporating the resulting solution at reduced pressure to obtain hydroxylamine hydrochloride.

7. A process for preparing hydroxylamine hydrochloride which comprises reacting about 50 parts by weight of acetone with an acid mixture containing about 75 parts by weight of concentrated (sp. gr. 1.18) hydrochloric acid and about 100 parts by weight of concentrated (sp. gr. 1.40) nitric acid for one hour at 30° C. to 70° C., diluting the resulting reaction mixture containing chloroisonitrosoacetone with about an equal volume of water, treating said mixture with chlorine gas for about six hours at 10° C. to 20° C., distilling off an aqueous distillate containing phosgene oxime from the resulting chlorinated solution, retaining the residue of unreacted chloroisonitrosoacetone for addition to the next solution of chloroisonitrosoacetone to be chlorinated, boiling the distillate containing phosgene oxime for about two hours and then evaporating the resulting solution to obtain hydroxylamine hydrochloride.

8. A process for preparing hydroxylamine hydrochloride which comprises reacting 50 parts by weight of acetone with a mixture of 75 parts by weight of concentrated (sp. gr. 1.18) hydrochloric acid and 100 parts by weight concentrated (sp. gr. 1.40) nitric acid for about one hour at 30° to 70° C., diluting the resulting reaction mixture containing chloroisonitrosoacetone with about an equal volume of water, treating said mixture with chlorine gas for about six hours at 10° C. to 20° C., distilling the resulting chlorinated solution at reduced pressure almost to dryness, retaining the residue of unreacted chloroisonitrosoacetone for addition to the next solution to be chlorinated, boiling the distillate containing the phosgene oxime for about two hours and then evaporating the resulting solution at reduced pressure to dryness or until hydroxylamine hydrochloride begins to separate.

9. A process for preparing hydroxylamine hydrochloride which comprises reacting 50 parts by weight of acetone with a mixture of 75 parts by weight of concentrated (sp. gr. 1.18) hydrochloric acid and 100 parts by weight concentrated (sp. gr. 1.40) nitric acid for about one hour at 30° C. to 70° C., diluting the resulting reaction mixture with about an equal volume of water, treating the mixture so obtained with chlorine gas for about six hours at 10° C. to 20° C., distilling the resulting chlorinated solution almost to dryness, boiling the distillate containing the phosgene oxime for about two hours and then evaporating the resulting solution at reduced pressure to separate the hydroxylamine hydrochloride.

10. A process for preparing hydroxylamine hydrochloride which comprises reacting chlorine gas with a mixture of about 70 parts by weight of chloroisonitrosoacetone and 100 to 1000 parts by weight of water for about one to twelve hours at 0° C. to 50° C., distilling the resulting solution containing phosgene oxime almost to dryness, retaining the residue of unreacted chloroisonitrosoacetone for addition to the next solution of chloroisonitrosoacetone to be chlorinated, boiling the distillate containing phosgene oxime for about two hours and then evaporating the resulting solution to separate hydroxylamine hydrochloride.

11. A process for preparing hydroxylamine hydrochloride which comprises reacting chlorine gas with a mixture of about 70 parts by weight of chloroisonitroacetone and about 500 parts by weight of water for about six hours at 10° C. to 20° C., distilling the resulting chlorinated solution containing phosgene oxime at reduced pressure almost to dryness, retaining the residue of unreacted chloroisonitrosoacetone for addition to the next solution of chloroisonitrosoacetone to be chlorinated, boiling the distillate containing phosgene oxime for about two hours and then evaporating the resulting solution at reduced pressure to recover hydroxylamine hydrochloride.

12. A process for preparing hydroxylamine hydrochloride which comprises reacting chlorine gas with a mixture of about 70 parts by weight of chloroisonitrosoacetone and about 100 to 1000 parts by weight of water for one to twelve hours at 0° C. to 50° C., distilling the resulting chlorinated solution containing phosgene oxime at reduced pressure almost to dryness, retaining the residue of unreacted chloroisonitrosoacetone for addition to the next solution of chloroisonitrosoacetone to be chlorinated, boiling the distillate containing phosgene oxime for about two hours and then evaporating the resulting solution at reduced pressure to dryness or until hydroxylamine hydrochloride begins to separate.

13. A process for preparing hydroxylamine hydrochloride which comprises reacting chlorine gas with a mixture of about 70 parts by weight of chloroisonitrosoacetone and 100 to 1000 parts by weight of water for about one to twelve hours at 0° C. to 50° C. thereby producing a solution containing phosgene oxime, distilling the resulting solution to obtain a distillate containing phosgene oxime and boiling the said distillate to form hydroxylamine hydrochloride.

14. A process for preparing hydroxylamine hydrochloride which comprises chlorinating a mixture of about 70 parts by weight of chloroisonitrosoacetone and 100 to 1000 parts by weight of water for about one to twelve hours at 0° C. to 50° C. thereby producing a solution containing phosgene oxime, distilling the resulting solution to obtain a distillate containing phosgene oxime, and hydrolyzing the phosgene oxime in the presence of HCl to form hydroxylamine hydrochloride.

15. A process for preparing hydroxylamine hydrochloride which comprises chlorinating an aqueous solution of chloroisonitroacetone, separating the phosgene oxime so formed from the resulting solution, and hydrolyzing said phosgene oxime to form hydroxylamine hydrochloride.

16. A process for preparing hydroxylamine hydrochloride which comprises reacting chlorine gas with an aqueous solution of chloroisonitrosoacetone, separating the phosgene oxime so formed from the resulting solution by distillation and boiling the distillate to form hydroxylamine hydrochloride.

17. A process for preparing hydroxylamine hydrochloride which comprises reacting 5 to 100 parts by weight of acetone with a mixture containing 4 to 55 parts by weight of 100% HCl, 70 parts by weight of 100% $HNO_3$ and 5 to 200 parts by weight of water during one-half to five hours at a reaction temperature of 30° to 70° C., treating the resulting solution with chlorine gas, boiling the resulting chlorinated solution and then evaporating the resulting solution at reduced pressure to obtain hydroxylamine hydrochloride.

18. A process for preparing hydroxylamine hydrochloride which comprises reacting 5 to 100 parts by weight of acetone with a mixture containing 4 to 55 parts by weight of 100% HCl, 70 parts by weight of 100% $HNO_3$ and 5 to 200 parts by weight of water during one-half to five hours at a reaction temperature of 30° C. to 70° C., diluting the reaction mixture with water up to five-fold volume, treating the resulting solution with chlorine gas, for from one to twelve hours at a temperature of 0° C. to 50° C., boiling the resulting chlorinated solution from about two to five hours and then evaporating the resulting solution at reduced pressure to obtain hydroxylamine hydrochloride.

19. A process for preparing hydroxylamine hydrochloride which comprises reacting 5 to 100 parts by weight of acetone with a mixture containing 4 to 55 parts by weight of 100% HCl, 70 parts by weight of 100% $HNO_3$ and 5 to 200 parts by weight of water during one-half to five hours at a reaction temperature of 30° C. to 70° C., separating the chloroisonitrosoacetone from the resulting solution by cooling and filtering or by evaporating, cooling and filtering, dissolving the chloroisonitrosoacetone in from 100 to 1000 parts by weight of water, treating said solution with chlorine gas for from one to twelve hours at a temperature of 0° C. to 50° C., boiling the resulting chlorinated solution from about two to five hours and then evaporating the resulting solution at reduced pressure to obtain hydroxylamine hydrochloride.

PHILIP J. EHMAN.
WALTER O. WALKER.

CERTIFICATE OF CORRECTION.

Patent No. 2,319,669.  May 18, 1943.

PHILIP J. EHMAN, ET AL.

It is hereby certified that error appears in the printed specification of the above numbered patent requiring correction as follows: Page 1, first column, line 11, for "$CH_3COCl:NOH$" read --$CH_3COCCl:NOH$--; and that the said Letters Patent should be read with this correction therein that the same may conform to the record of the case in the Patent Office.

Signed and sealed this 6th day of July, A. D. 1943.

(Seal)

Henry Van Arsdale,
Acting Commissioner of Patents.